United States Patent
Ogihara

[11] Patent Number: 5,834,038
[45] Date of Patent: Nov. 10, 1998

[54] BLOW MOLDING APPARATUS

[75] Inventor: Shuichi Ogihara, Komoro, Japan

[73] Assignee: Nissei Asb Machine Co., Ltd., Komoro, Japan

[21] Appl. No.: 570,166

[22] Filed: Dec. 11, 1995

[30] Foreign Application Priority Data

Dec. 14, 1994 [JP] Japan .................................. 6-332955

[51] Int. Cl.$^6$ ................................................. B29C 49/64
[52] U.S. Cl. .......................... 425/182; 425/526; 425/533; 425/534
[58] Field of Search .................. 425/526, 529, 425/534, 533, 182

[56] References Cited

U.S. PATENT DOCUMENTS

| | | | |
|---|---|---|---|
| 3,149,373 | 9/1964 | Marzillier | 425/534 |
| 4,070,428 | 1/1978 | Krall et al. | 425/534 |
| 4,234,297 | 11/1980 | Kontz | 425/526 |
| 4,354,813 | 10/1982 | Collombin | 425/182 |
| 4,362,498 | 12/1982 | Harry et al. | 425/526 |
| 4,365,950 | 12/1982 | Harry et al. | 425/534 |
| 4,382,760 | 5/1983 | Wiatt et al. | 425/139 |
| 4,432,720 | 2/1984 | Wiatt et al. | 425/534 |
| 4,435,146 | 3/1984 | Wiatt et al. | 425/534 |
| 4,456,447 | 6/1984 | Smith | 425/182 |
| 4,484,884 | 11/1984 | Wiatt et al. | 425/534 |
| 4,487,568 | 12/1984 | Wiatt et al. | 425/534 |
| 4,498,859 | 2/1985 | Gibbemeyer | 425/534 |
| 4,601,869 | 7/1986 | Harry et al. | 264/523 |
| 5,498,152 | 3/1996 | Unterlander et al. | 425/534 |
| 5,549,468 | 8/1996 | Mitchell et al. | 425/526 |

FOREIGN PATENT DOCUMENTS

| | | |
|---|---|---|
| 56-60227 | 5/1981 | Japan . |
| 57-182408 | 11/1982 | Japan . |
| 58-82733 | 5/1983 | Japan . |
| 2-62226 | 3/1990 | Japan .................................. 264/535 |
| 4-65217 | 3/1992 | Japan .................................. 264/535 |
| 6-99482 | 4/1994 | Japan .................................. 425/526 |

*Primary Examiner*—Robert Davis
*Attorney, Agent, or Firm*—David L. Hoffman; Cislo & Thomas LLP

[57] ABSTRACT

A blow molding apparatus which can be simplified in structure, reduced in size and facilitated in maintenance, and which can improve the heat efficiency and equalize the temperature gradations. The blow molding apparatus has a preform supply section, preform heating sections, a blow molding section, a product removing section and a conveying section. The conveying section intermittently conveys preforms while maintaining a fixed spacing between adjacent preforms. The preform heating section is divided into first and second heating portions. The first heating portion has heaters extending along the preforms while the second heating portion includes heaters extending in the direction of preform conveyance and aligned vertically. The first heating portion heats the preforms, and the second heating portion applies a temperature distribution to the preform. The second heating portion includes heaters extending along the preforms and disposed at positions where the preforms stop intermittently on each side of the preform conveying path.

14 Claims, 8 Drawing Sheets

BLOW MOLDING APPARATUS

BACKGROUND OF THE INVENTION

1. Field of the Invention

The present invention relates to a blow molding apparatus and method and particularly to an apparatus and method of heating and subsequently blow molding a synthetic resin preform.

2. Description of the Prior Art

Cold parison type and two-stage type methods of blow molding synthetic resin preforms (parison) into containers are known in the prior art.

The cold parison type method normally uses a preform injection molding machine and a separate blow molding machine. After the injection molding, the temperature of molded preforms are lowered to a room temperature. Preforms are then re-heated for blow molding in the blow molding machine.

More particularly, the blow molding machine comprises a preform heating section and a blow molding section. The preform heating section heats preforms up to a specified blow molding temperature, and afterwards the blow molding section blow molds the preforms into given final products.

In the prior art blow molding machine, the preform heating section includes heaters which extend in the direction of preform conveyance and are aligned in the vertical direction.

The spacing between adjacent preforms in the preform heating section is different from the spacing between adjacent preforms in the blow molding section.

More particularly, the spacing between adjacent preforms in the blow molding section is relatively large depending on the size of products to be molded and the width of the blow molding section. Conversely, the spacing between adjacent preforms in the preform heating section is preferably as small as possible for improving the heat efficiency, since the preforms are subjected to heating by the heaters extending in the direction of preform conveyance. Therefore, the spacing between adjacent preforms in the preform heating section is set to smaller than the spacing between adjacent preforms in the blow molding section, as disclosed by Japanese Patent Application Laid-Open No. 56-60227.

The prior art cold parison type blow molding machine requires means for changing the spacing between adjacent preforms in the preform heating section, because the spacing between adjacent preforms should be set smaller in the preform heating section than in the blow molding section. This complicates the machine structure and increases the size thereof, further resulting in troublesome maintenance and increasing the manufacturing cost.

Presumably, Japanese Patent Application Laid-Open Nos. 57-182408 and 58-82733 propose to overcome the above problems without changing the spacing between adjacent preforms in the preform heating sections Nevertheless, the two prior art raises another problem in that the heaters are disposed wastefully, and heat the spacing between adjacent preforms where preforms are not present, because the heaters in the preform heating section extend in the direction of preform conveyance and are aligned in the vertical direction. This lowers the heat efficiency.

Japanese Patent Application Laid-Open No. 57-182408 proposes to convey the preforms by a chain circulated in the vertical direction. However, the prior art raises still another problem in extremely increasing the height of the machine.

Japanese Patent Application Laid-Open No. 58-82733 proposes to convey the preforms by an endless conveyor chain mechanism mainly using the longitudinally extending runs. However, such a conveyor chain mechanism has useless sections in the conveying path, and thus reduces the efficiency.

In any event, the blow molding machine requires a mechanism for grasping the preforms and thus complicates the structure thereof.

SUMMARY OF THE INVENTION

It is therefore an object of the present invention to provide a blow molding apparatus and method which can be simplified in structure.

Another object of the present invention is to provide a blow molding apparatus and method which can be simplified in maintenance.

Still another object of the present invention is to provide a blow molding apparatus and method which can improve the heat efficiency in the preform heating section of the blow molding machine.

To this end, the present invention provides an apparatus for heating and subsequently blow molding synthetic resin preforms, comprising:

a preform supply section for receiving and transferring preforms;

preform heating sections for heating the preforms received from the preform supply section up to a blow molding temperature;

a blow molding section for blow molding the preforms heated in the preform heating sections into final products;

a product removing section for removing the blow molded products; and a conveying section for sequentially conveying the preforms and the products to the preform heating, blow molding and product removing sections; and wherein, the conveying section includes a substantially rectangular conveying path;

the blow molding section is disposed on a shorter side of the conveying path; and the preform heating sections are disposed on the other three sides of the conveying path.

In general, the blow molding section has a mold clamping mechanism having large mold opening and closing strokes. When such a clamping mechanism is disposed on a longer side of the substantially rectangular conveying path, the shorter sides of the conveying path will be increased to enlarge an installation space for the blow molding machine. Therefore, the present invention provides the blow molding section disposed on a shorter side of the conveying path, so that the length of the longer sides can be used effectively to reduce the installation space.

According to the present invention, the preform heating sections are disposed on the three sides of the conveying path with the exception of the shorter side on which the blow molding section is disposed. Therefore, it is possible to provide sufficient distance between adjacent preform heating sections and to ensure the necessary time required for the preform temperature rise and the temperature distribution.

In such a case, it is preferred that the preform conveying section includes conveyor members for holding the preforms and the products, and a conveyor chain on which the conveyor members are fixedly mounted, and wherein the conveyor members move with movement of the conveyor chain.

With such a conveyor chain, the conveying path can be designed freely with a signal drive, thus providing a more inexpensive and simple mechanism. Since the spacing between adjacent preforms is maintained by the conveyor members fixedly mounted on the conveyor chain, the conventional means for changing the spacing between adjacent preforms can be omitted. This can simplify the structure of the blow molding section, reduce the manufacturing cost thereof, and facilitate the maintenance.

In the present invention, it is further preferable that a heating and rotating chain for heating and rotating the preforms extends along the three sides of the conveying path on which the preform heating sections are disposed.

In such a case, a single drive can rotate the preforms to heat them uniformly about the circumference in the three preform heating sections.

It is further preferable that the heating and rotating chain, and the conveyor chain rotate all the conveyor members long the three sides of the conveying path on which the preform heating sections are disposed, resulting in rotation of the preforms.

This can provide an increased degree of freedom in the design and a more inexpensive and simple mechanism.

In the present invention, it is further preferable that the conveying section comprises conveyor members for holding the preforms and the products, a conveyor chain on which the conveyor members are fixedly mounted, four first sprockets which are disposed in corners of the conveying path and engage with the conveyor chain, and three second sprockets which are disposed in the corners of the three sides of the conveying path on which the preform heating sections are disposed and engage with the heating and rotating chain, and wherein the first and second sprockets disposed in the same corners share a shaft.

Thus, the preforms being conveyed in the preform heating sections can be rotated reliably, and the structure can further be simplified.

It is further preferable that the preform heating section disposed on a longer upstream side of the conveying path followed by the shorter side on which the blow molding section is placed includes heaters extending in a direction of preform conveyance and aligned vertically.

Thus, a temperature distribution can be provided along the axial direction of the preforms by the heaters. Although such a temperature distribution would require a relatively long time in the prior art, the present invention can ensure a sufficient heating time by heating the preforms through the heaters extending along the longer side of the conveying path in the direction of preform conveyance.

In the present invention, it is further preferable that the conveying section conveys the preforms intermittently, and wherein the preform heating section disposed on a longer upstream side of the conveying path includes a heater extending in a longitudinal direction of the preform on each side of the conveying path and is disposed at a position where each preform stops intermittently.

Such longitudinal heaters can shorten the heating time and be positioned closest to the preform without any obstruction in conveyance.

In the present invention, it is further preferable that the product removing section is juxtaposed with the preform supply section at an end of a longer downstream side of the conveying path followed by the shorter side on which the blow molding section is disposed in a direction of preform conveyance.

Thus, it is possible to facilitate the maintenance by disposing the product removing and preform supply sections at the end of the longer downstream side of the conveying path, rather than on the shorter side on which the blow molding section with a relatively complicated structure is provided.

In the present invention, it is further preferable that the conveyor chain includes link members and hollow pins connecting the link members, and wherein each of the conveyor members includes a fixing pin detachably inserted into a corresponding hollow pin and is connected to the conveyor chain by the fixing pin.

Since the conveyor members are connected to the conveyor chain only by the detachable fixing pins, the position of the conveyor members can be changed easily to vary the pitch in the conveyor members simply by removing and re-inserting the fixing pins relative to the hollow pins.

In another embodiment, the present invention provides an apparatus for heating and subsequently blow molding synthetic resin preforms, comprising:

a preform supply section for receiving and transferring preforms;

preform heating sections for heating the preforms received from the preform supply section up to a blow molding temperature;

a blow molding section for blow molding the preforms heated in the preform heating sections into final products;

a product removing section for removing the blow molded products; and a conveying section for sequentially conveying the preforms and the products to the preform heating, blow molding and product removing sections; and wherein, the conveying section includes conveyor members for holding the preforms and the products, and a conveyor chain on which the conveyor members are fixedly mounted, each of the conveyor members has a base engaging with the conveyor chain and a conveyor pin detachably mounted on the base, the conveyor pin is inserted into a corresponding preform for holding the preform.

When the conveyor pins are detachably mounted on the bases of the respective conveyor members, the conveyor pins can be replaced easily with new conveyor pins for meeting other preforms of different diameters.

In such a case, it is preferable that the conveyor chain includes link members and hollow pins connecting the link members, and wherein each of the conveyor members has a fixing pin detachably inserted into a corresponding hollow pin, the base of each of the conveyor members is connected to the conveyor chain by the fixing pin.

Thus, when the conveyor pins are replaced with different conveyor pins, the conveyor members can easily accommodate to different preforms. In addition, the system can easily accommodate to the pitch changes due to changes of the conveyor member position.

In still another embodiment, the present invention provides an apparatus for heating and subsequently blow molding synthetic resin preforms, comprising:

a preform supply section for receiving and transferring preforms;

preform heating sections for heating the preforms received from the preform supply section up to a blow molding temperature;

a blow molding section for blow molding the preforms heated in the preform heating sections into final products;

a product removing section for removing the blow molded products; and a conveying section for sequentially conveying the preforms and the products to the preform heating, blow molding and product removing sections; and wherein, the conveying section conveys the preforms intermittently;

the preform heating sections include first and second heating portions;

the first heating portion includes a heater extending in a longitudinal direction of the preforms;

and the second heating portion includes heaters which extend in a direction of preform conveyance and are aligned vertically.

The heater of the first heating portion extending in the longitudinal direction of the preforms serves to heat the preforms up to an appropriate blow molding temperature or a temperature slightly lower than the blow molding temperature. The heaters of the second heating portion which extend in the direction of preform conveyance and aligned vertically provide a temperature distribution extending in the longitudinal direction of the preforms. Therefore, the longitudinally extending heater of the first heating portion can heat the preforms entirely in the longitudinal direction. As a result, the heater can be used more efficiently in the first heating portion.

In the present invention, it is preferable that the conveying section conveys preforms to be blow molded at a time while maintaining spacing between adjacent preforms which is suitable for a blow molding step.

Thus, the performs to be blow molded at a time can be conveyed intermittently, while maintaining the spacing between adjacent preforms which is suitable for the blow molding step. This can enable the preforms to be heated effectively and meet the blow molding cycle.

In a further embodiment, the present invention provides an apparatus for heating and subsequently blow molding synthetic resin preforms, comprising:

a preform supply section for receiving and transferring preforms;

preform heating sections for heating the preforms received from the preform supply section up to a blow molding temperature;

a blow molding section for blow molding the preforms heated in the preform heating sections into final products;

a product removing section for removing the blow molded products; and a conveying section for sequentially conveying the preforms and the products to the preform heating, blow molding and product removing sections; and wherein, the conveying section conveys the preforms intermittently; and the preform heating sections include a heater which extends in a longitudinal direction of the preform on each side of the conveying path and is disposed at a position where each preform stops intermittently.

Such an arrangement may shorten the heating time and position the heaters most adjacent to the preform conveying path without any obstruction, thus improving the heat efficiency.

In the present invention, it is preferable that the the conveying section conveys preforms to be blow molded at a time while maintaining spacing between adjacent preforms which is suitable for a blow molding step.

Thus, the preforms can be heated more efficiently in a manner suitable for the blow molding cycle.

The present invention further provides a method of heating and subsequently blow molding synthetic resin preforms, comprising the steps of:

transferring preforms along a conveying path and sequentially supplying the preforms to a blow molding section;

heating the preforms up to a blow molding temperature in at least one preform heating section; and blow molding the preforms into products in blow molds by using a compressed fluid; and wherein, the preform heating step includes a first heating step of heating substantially the entire preforms up to a temperature equal or slightly lower than the blow molding temperature; and a second heating step of heating the preforms with temperature gradations in an axial direction thereof after the first heating step.

The energy in the heating procedure can be used more effectively by dividing the preform heating step into first and second heating steps. The first heating step heats the entire preforms and the second heating step provides a temperature distribution in the axial direction of the preforms.

In such a case, it is preferred that the first heating step includes the step of heating the preforms with heaters extending in a longitudinal direction of the preforms.

Such longitudinally extending heaters can heat the preforms more effectively.

It is also preferable that the second heating step includes the step of heating the preforms with heaters extending in a direction of preform conveyance and aligned vertically.

Thus, a temperature distribution can be applied reliably in the axial direction of the preforms.

In the present invention, it is further preferable that the blow molding method comprises the steps of:

providing a substantially rectangular preform conveying path for conveying the preforms;

providing the blow molding section on a shorter side of the conveying path;

providing the preform heating sections on three sides of the conveying path excluding the shorter side on which the blow molding section is disposed; and heating the preforms in the preform heating sections and subsequently blow molding the preforms into products in the blow molding section.

In the present invention, it is further preferable that the blow molding method comprises the steps of:

providing a heating and rotating chain for heating and rotating the preforms which extends along the three sides of the conveying path on which the preform heating sections are disposed; and heating and rotating the preforms in the preform heating sections.

In the present invention, it is further preferable that the blow molding method further comprises the steps of:

providing heaters extending in a direction of preform conveyance and aligned vertically on a longer upstream side of the conveying path followed by the shorter side on which the blow molding section is disposed; and heating the preforms with the heaters.

In the present invention, it is further preferable that the blow molding method comprises the steps of:

juxtaposing a preform supply section with a product removing section on an end of a longer downstream side of the conveying path followed by the shorter side on which the blow molding section is disposed; and supplying the preforms and removing products on the longer downstream side of the conveying path followed by the shorter side on which the blow molding section is provided.

DETAILED DESCRIPTION OF THE PREFERRED EMBODIMENTS

Preferred embodiments of the present invention will now be described in detail with reference to the drawings.

FIGS. 1–9 show a blow molding apparatus constructed in accordance with an embodiment of the present invention.

The blow molding apparatus is of a cold parison type that heats and blow molds preforms formed by a separate injection molding machine.

Figure 1:
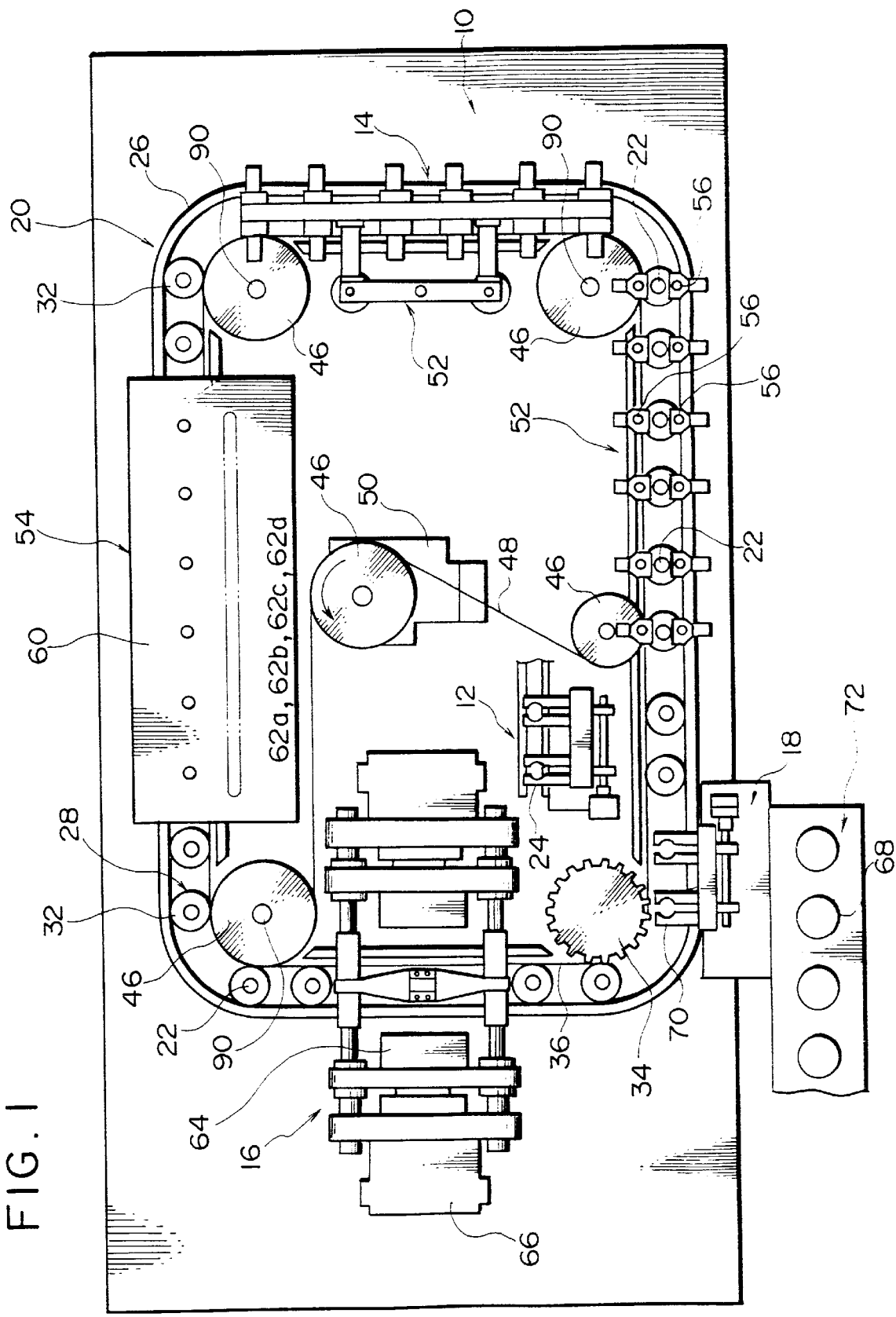
FIG. 1 is a plan view of a blow molding apparatus constructed in accordance with one embodiment of the present invention.

As shown in FIG. 1, the blow molding apparatus comprises a preform supply section 12, preform heating sections 14, a blow molding section 16 and a product removing section 18, all of which are disposed on a machine base 10 along an endless loop-like conveying section 20.

The conveying section 20 forms a substantially rectangular conveying path. The blow molding section 16 is disposed on a shorter side of the rectangular conveying path, while the preform heating sections 14 are disposed on the other three sides. The preform supply and product removing sections 12, 18 are juxtaposed at the end of the longer downstream side of the conveying path followed by the shorter side on which the blow molding section 16 is disposed in the direction of preform conveyance. The preform supply section 12 receives injection molded preforms 22 from an injection molding machine (not shown), delivers the preforms to the conveying section 20, and comprises a pair of chuck mechanisms 24 for receiving and grasping the necks of two preforms 22. The preforms 22 are stored in a preform stacker (not shown) and then fed into arranging means by any conveyor means such as a belt conveyor. The preforms 22 are arranged in the arranging means before they are received by the chuck mechanisms 24. The chuck mechanisms 24 grasp the necks of the two preforms 22 and are turned over to deliver the preforms 22 to the conveying section 20 with the necks of the preforms facing downwards.

The conveying section 20 includes a pair of loop-like conveyor rails 26 along which the preforms 22 are conveyed from the preform supply section 12 to in the sequence of the preform heating, blow molding and product take-out sections 14, 16, 18, as shown in FIG. 1. A plurality of conveyor members 28 engage with the conveyor rails 26 with a specified pitch.

Figure 6:
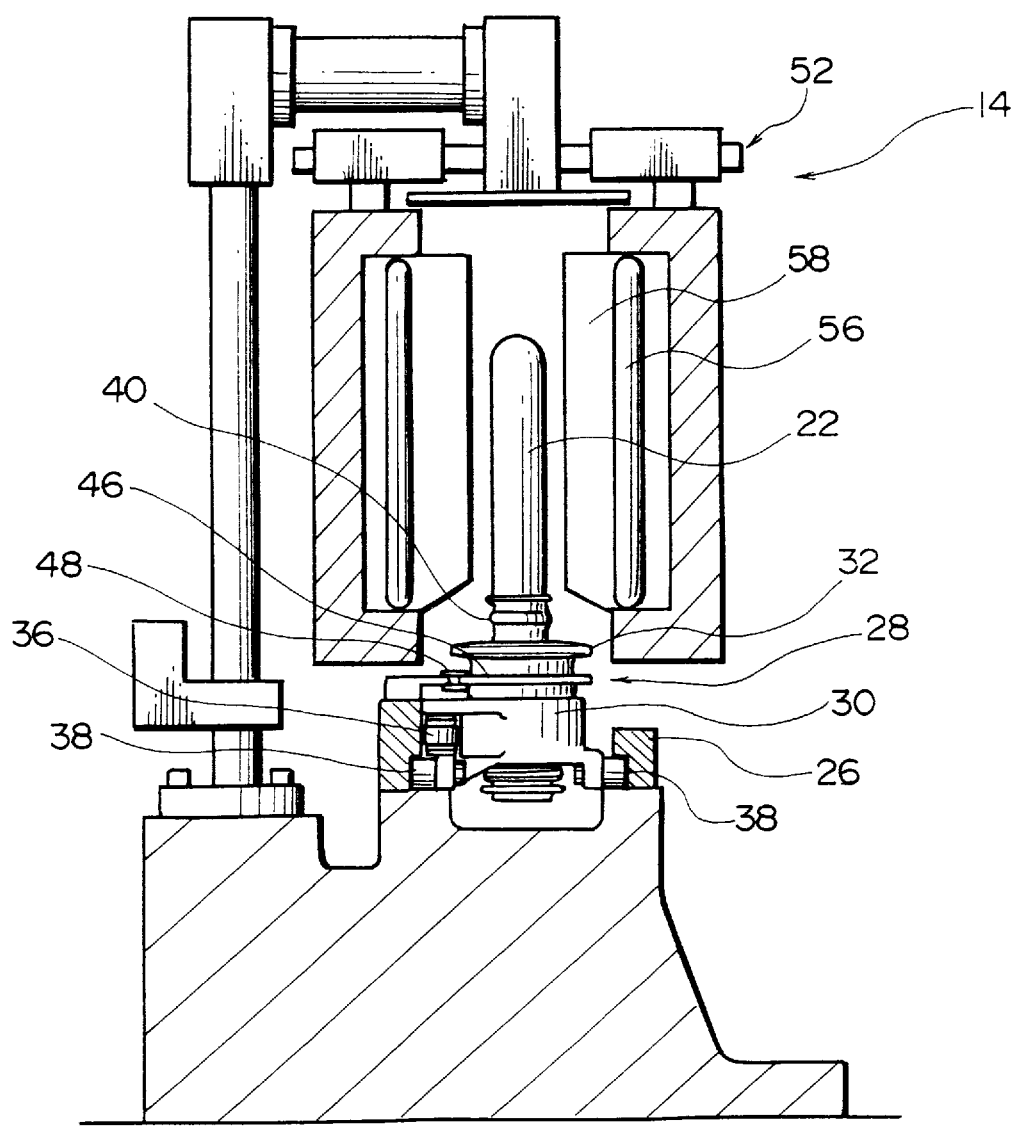
FIG. 6 is an enlarged sectional view of a heater shown in FIGS. 4 and 5.
Figure 7:
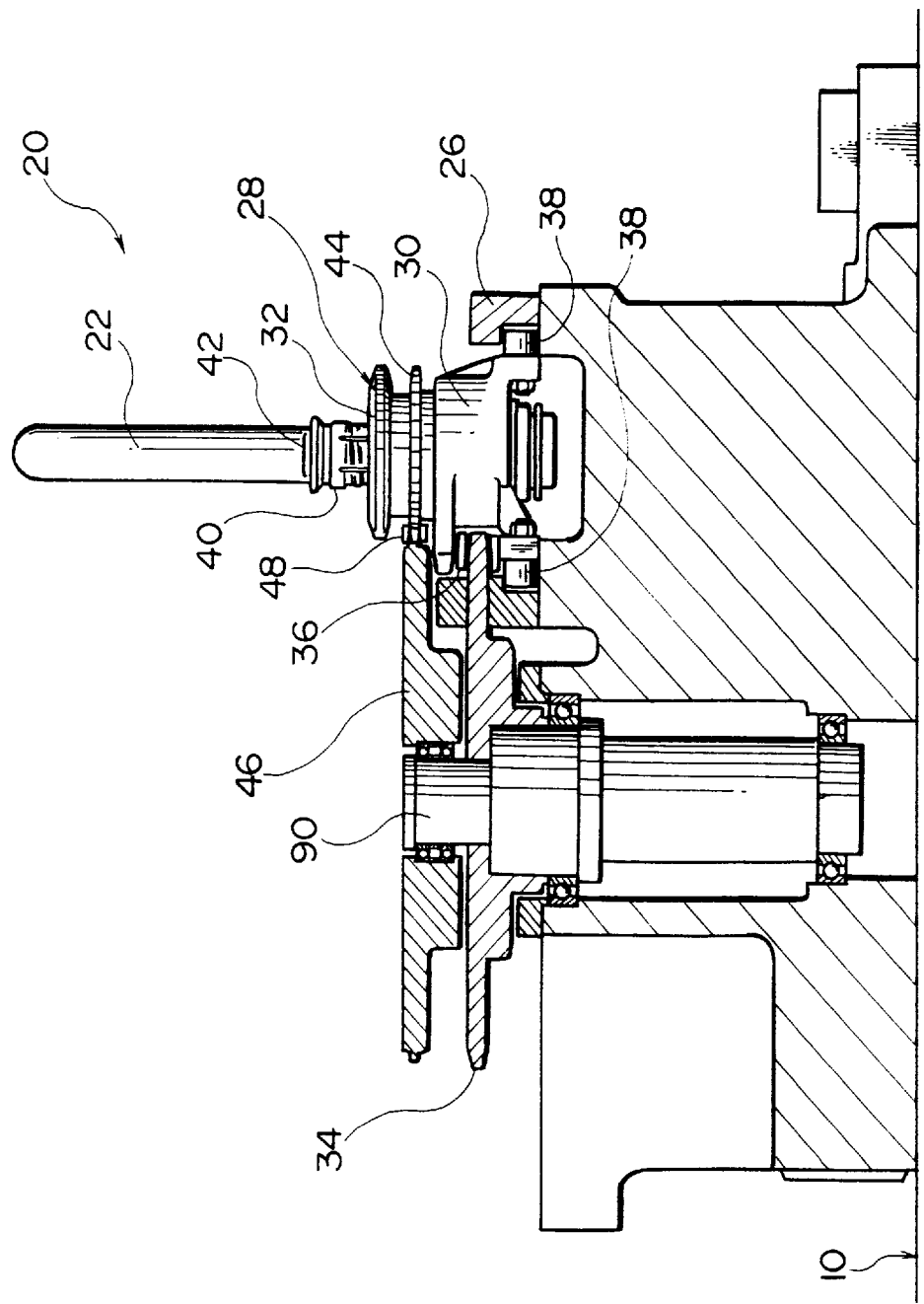
FIG. 7 is a sectional view of a conveying section.

As shown in FIGS. 6 and 7, each of the conveyor members 28 comprises a fixed portion 30 forming a base, a placing bed 32 rotatably mounted on the fixed portion 30 and a conveyor pin 42. The fixed portion 30 is engaged with the conveyor rails 26 through cam followers 38 and also with a conveyor chain 36 that winds round a conveyor sprocket 34. The conveyor sprocket 36 is rotatably driven so as to move the conveyor members 28 along the conveying path.

Figure 9:
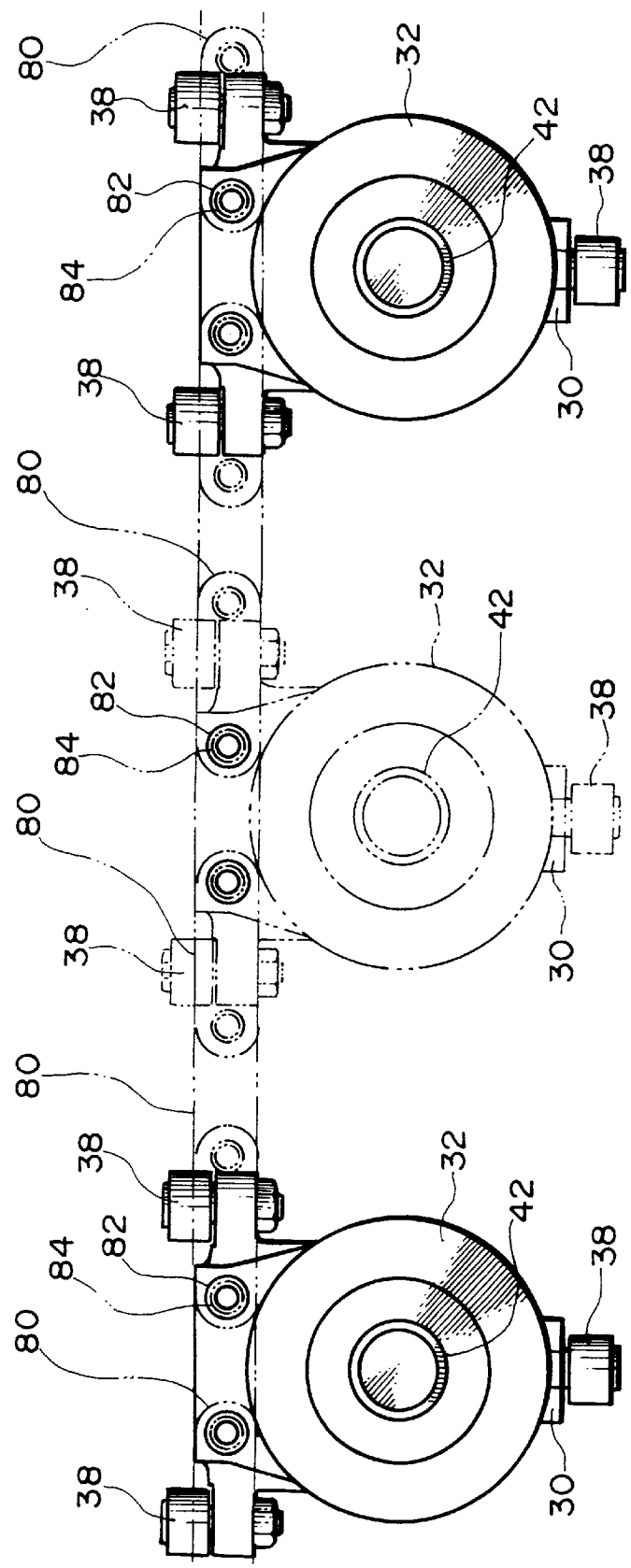
FIG. 9 is a plan view of a conveyor member pitch being changed.

As shown in FIG. 9, the conveyor chain 36 comprises a plurality of link members 80 and hollow pins 82 rotatably connecting the link members 80 with one another. Each of the hollow pins 82 detachably receives a fixing pin 84. Thus, the fixed portion 30 is connected to the conveyor chain 36 through two fixing pins 84 at two points.

When the fixing pins 84 is pulled out from the hollow pins 82, the corresponding conveyor member 28 can be removed easily from the conveyor chain 36. Therefore, the pitch in the train of conveyor members 28 can be changed easily.

The placing bed 32 is rotatably mounted on the fixed portion 30 and includes a conveyor pin 42 upwardly extending from the top thereof. The conveyor pin 42 is inserted into the neck 40 of a preform 22 so as to support the preform 22 upside down by the conveyor pin 42.

Figure 8:
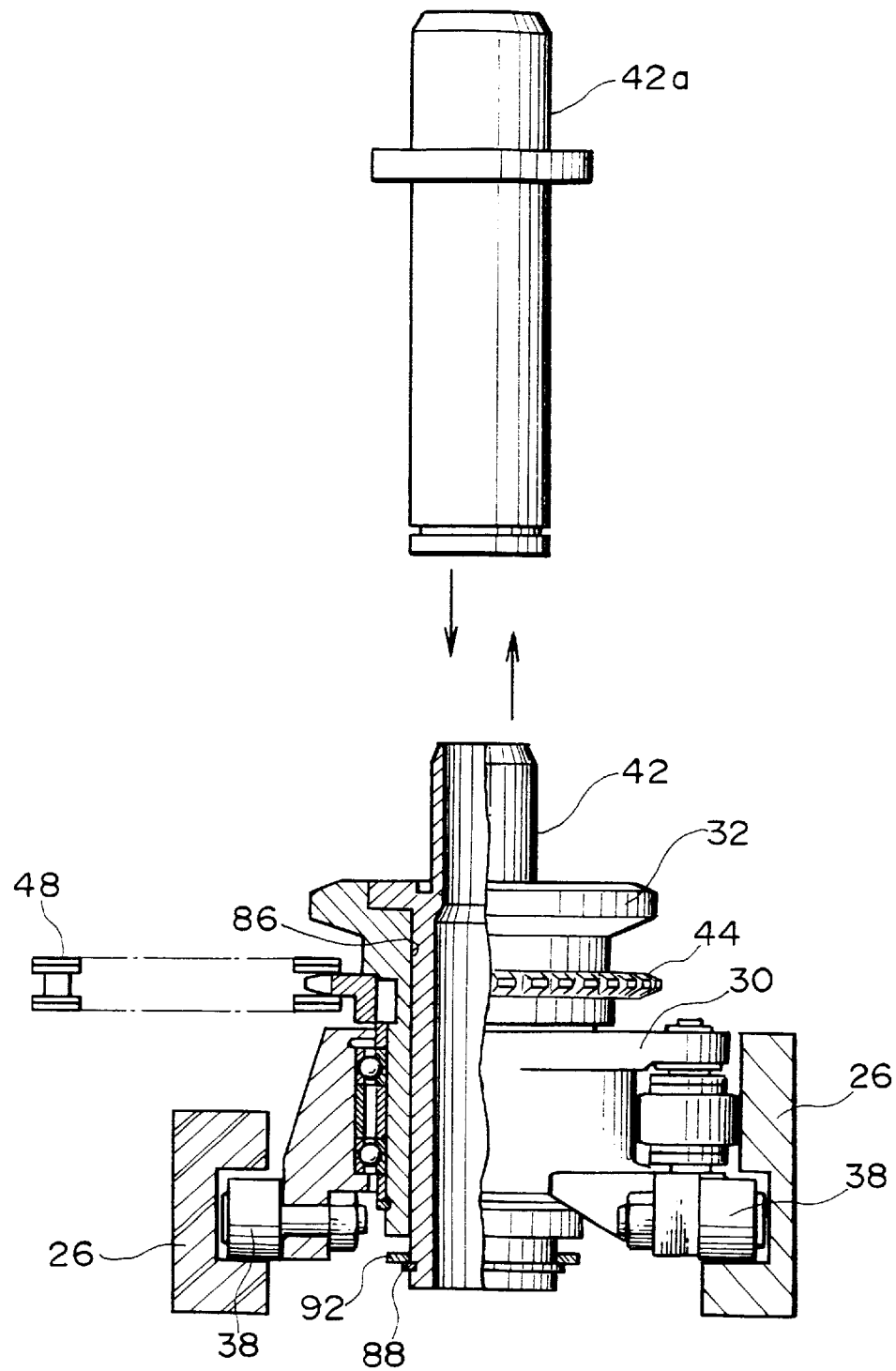
FIG. 8 is a sectional view of a conveyor pin replaced by new one.

As shown in FIG. 8, each of the conveyor pins 42 is inserted into a bore 86 centrally formed through the placing bed 32, and engages with the placing bed 32 at the top end. The bottom end of the conveyor pin 42 receives an interference member 92 such as washer and detachably installs an anti-fall member 88 such as O-ring.

When the interference and anti-fall members 92, 88 are removed from the bottom end and the conveyor pin 42 is lifted up, the conveyor pin 42 can be removed easily from the placing bed 32. On blow molding preforms having an internal diameter different from the present preforms, as shown in FIG. 8 the conveyor pins 42 can be replaced with conveyor pins 42a having diameter corresponding to the internal diameter of the preforms to be blow molded. Note that the interference members 92 are not necessarily required by the present invention. Without any interference member, it would further facilitates the removal of the conveyor pins 42 from the conveyor members 28.

A rotation sprocket 44 is integrally formed on each of the placing beds 32 and operatively engages with a chain 48 that is passed around sprockets 46 and extends along the three sides of the conveying path along which the preform heating sections 14 are disposed. As a preform rotating motor 50 is powered, its driving force moves the placing beds 32, so as to rotate the preforms 22 about their own rotational axis within the preform heating area provided by the preform heating sections 14.

The rotation sprocket 44 at each corner of the conveying path shares a shaft 90 with the corresponding conveyor sprocket 34.

Therefore, the preforms 22 can reliably be rotated about their own axis through the entire heating area provided by the preform heating sections 14.

In this embodiment, the blow molding section 16 is adapted to blow mold two preforms 22 at a time. The conveying section 20 provides spacing 1, between two adjacent preforms 22 (see FIG. 2) which is equal to the spacing between two adjacent preforms 22 blow molded by the blow molding section 16 at a time.

Furthermore, the preform supply section 12 feeds two preforms 22 to the conveying section 20 while maintaining the spacing $l_1$.

The conveying section 20 conveys the conveyor members 28 intermittently through the conveyor sprocket and chain 34, 36 with a given conveying pitch 12, while maintaining the spacing $l_1$ between adjacent preforms. The conveying pitch $l_2$ is determined depending on the movement pitch of the preforms 22 fed to the blow molding section 16.

When the spacing $l_1$ between adjacent preforms 22 is maintained in the conveying section 20 in the above manner, the blow molding apparatus does not require means for changing the spacing between adjacent preforms 22. This can simplify the structure of the blow molding apparatus, reduce the manufacturing cost and facilitate the maintenance.

If three preforms rather than two are to be blow molded at a time, one conveyor member 28 may simply be added between two adjacent conveyor members 28, as shown in FIG. 9.

The preform heating sections 14 heat the preforms 22 being conveyed from the preform supply section 12 to the conveying section 20 with a specified conveying pitch $l_2$ up to a blow molding temperature. In this embodiment, the preform heating sections 14 comprise first and second heating portions 52, 54, as shown in FIG. 1. The first heating portion 52 heats the preforms 22 to the blow molding temperature or a temperature slightly lower than the blow molding temperature, while the second heating portion 54 applies a vertical temperature distribution to the preforms 22. Such an arrangement may more effectively utilize all the energy in the heating step.

As seen best from FIG. 1, the first heating portion 52 is formed into an L-shaped configuration which extends from a longer side to a shorter side of the conveying path located at the front portion of the machine base 10, thus providing a sufficient heating time. The first heating portion 52 includes a plurality of heater pairs 56, and each pair has two separate heaters 56 vertically located on the opposite sides of the conveying path for heating the preforms 22 at positions corresponding to the conveying pitch $l_2$ where the preforms 22 are intermittently stopped by the conveying section 20. Each of the heaters 56 in the first heating portion 52 extends parallel to the preforms 22 in the longitudinal direction thereof, and is surrounded by a reflector plate 58. Thus, the preforms 22 can be heated effectively over the entire length in the longitudinal direction thereof.

If heaters extend in the direction of preform conveyance as in the prior art, they will wastefully heat a space between any two adjacent preforms 22 where the preform is not present, since the spacing $l_1$ is provided between adjacent preforms. However, the present invention can effectively heat the preforms 22 by using the vertical and separate heaters 56 in the first heating portion 52. Furthermore, by disposing these heaters 56 at the positions at which the preforms 22 stop intermittently, it is possible to reduce the heating time and locate the heaters 56 closest to the conveying path without causing any obstruction to the preform conveyance, thus improving the heat efficiency.

The heat efficiency can further be improved in a manner most suitable for a blow molding cycle by intermittently conveying two preforms at a time, while maintaining the spacing $l_1$ between two preforms to be blow molded at a time.

The heaters 56 in the first heating portion 52 are fixedly mounted on a heater fixing plate 57. When the heater fixing plate 57 inclines over the hinge 59 backward or forward, a temperature gradient can be applied to the preforms 22 in the axial direction thereof. Furthermore, any differences in the heat distribution between heaters 56 can be corrected by controlling the inclination of the heater fixing plates For example, the temperature of a rod-like heater tends to be lower at each end and highest at the central part thereof.

If the heater fixing plates 57 inclines to bring the ends of the heaters 56 closer to the necks 40 of the preforms 22, the temperature near the necks 40 may be prevented from being lower than the temperature of the other preform parts. Furthermore, depending on the wall-thickness of the preforms 22, the temperature may be set to increase gradually toward the preform necks 40.

Figure 3:
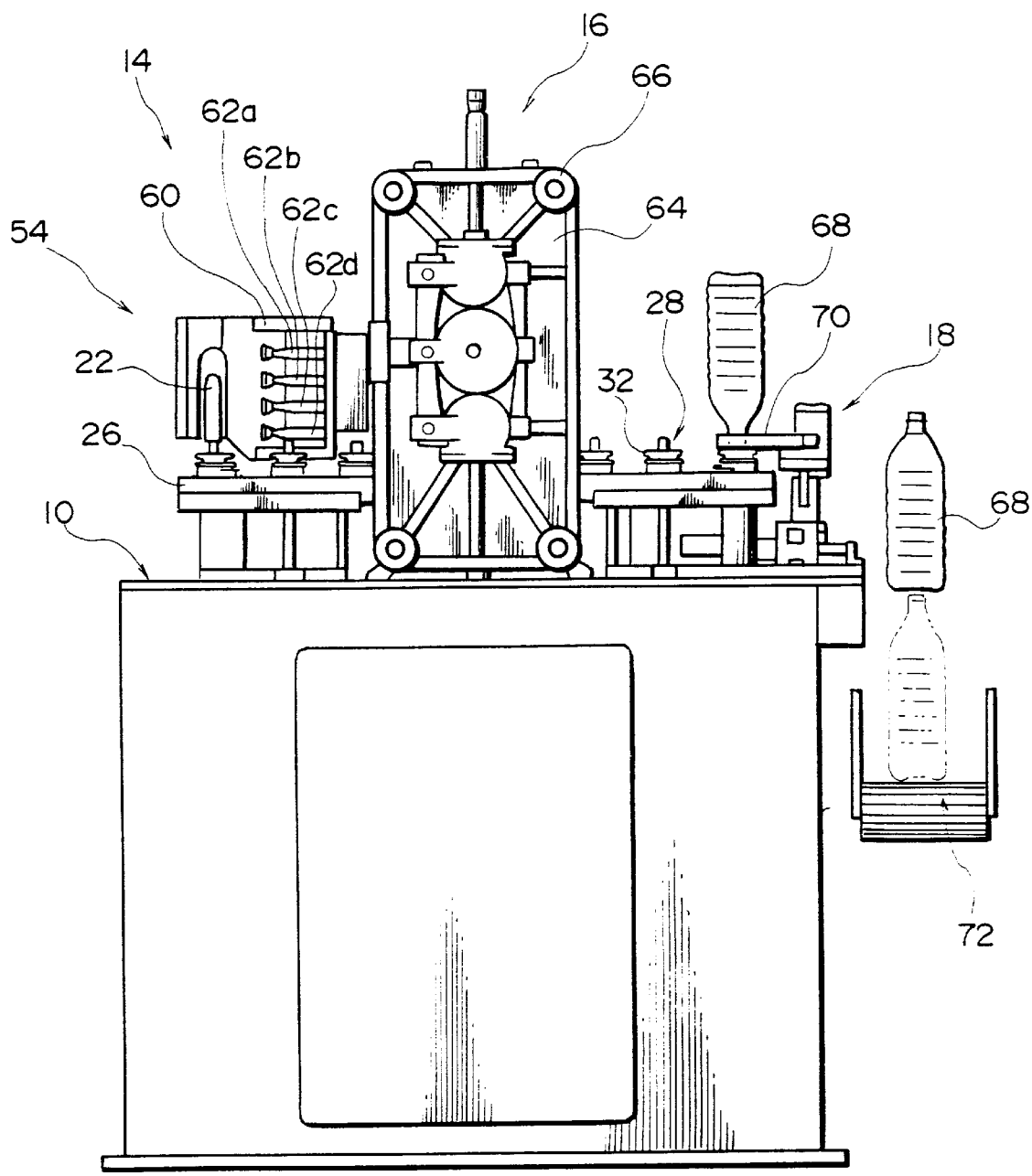
FIG. 3 is a side view of the blow molding apparatus shown in FIGS. 1 and 2 from a blow molding section.
Figure 4:
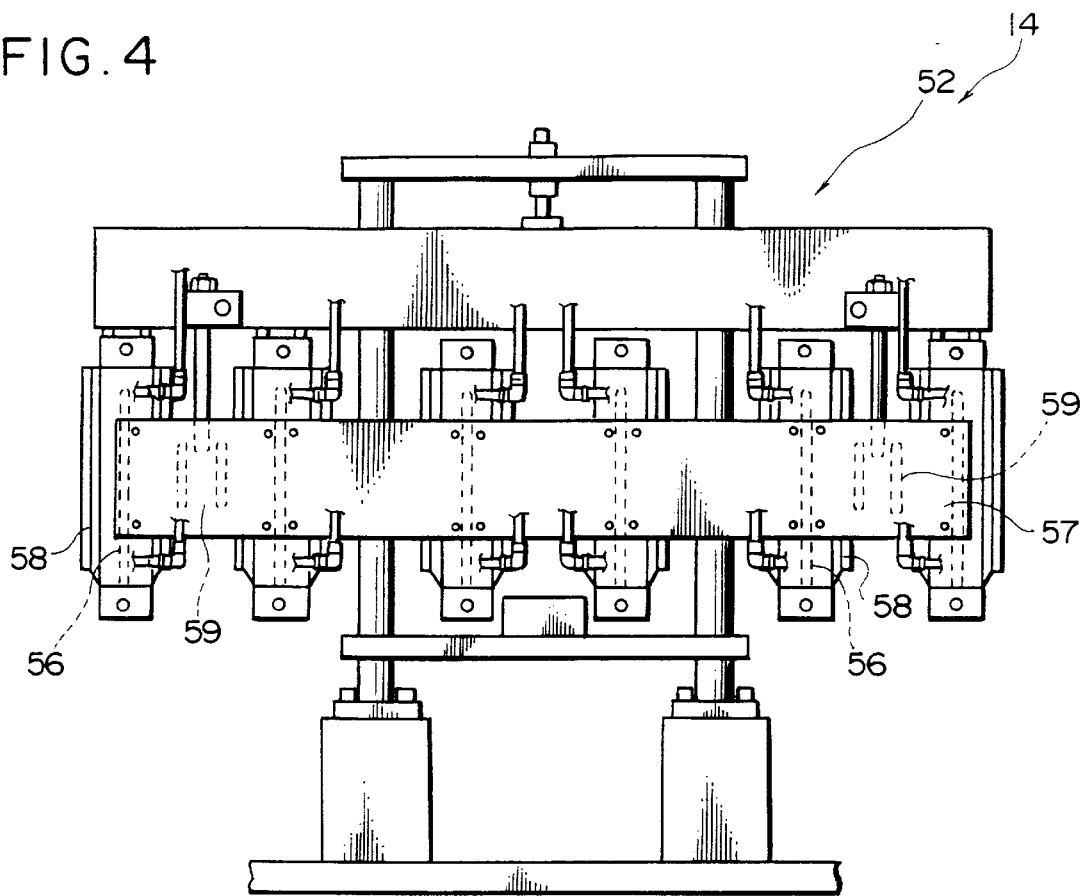
FIG. 4 is an enlarged front view of a first heating portion shown in FIG. 3.
Figure 5:
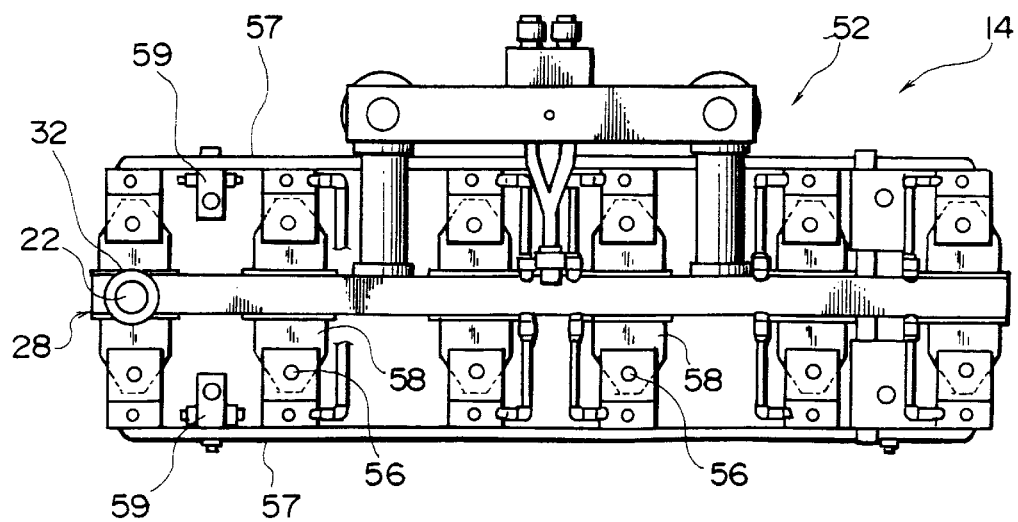
FIG. 5 is a plan view of a first heating portion shown in FIG. 4.

As seen best from FIGS. 1 and 3, the second heating portion 54 is disposed on a longer upstream side of the conveying path located at the back of the machine base 10 and followed by a shorter side of the conveying path on which the blow molding section 16 is disposed. As shown in FIG. 3, the second heating portion 54 comprises a heating box 60 and heaters 62a, 62b, 62c and 62d which are located on one side of the conveying path in the heating box 60, extend in the direction of preform conveyance and aligned vertically. By adjusting the temperature in the heaters 62a, 62b, 62c and 62d, a vertical temperature distribution may be applied to the preforms 22.

The blow molding section 16 blow molds the preforms 22 into final products after they have been heated by the preform heating sections 14. The blow molding section 16 comprises two blow molds 64 having split molds with cavity surfaces and two blow mold clamping devices 66 each for opening and closing the corresponding blow mold 64.

Figure 2:
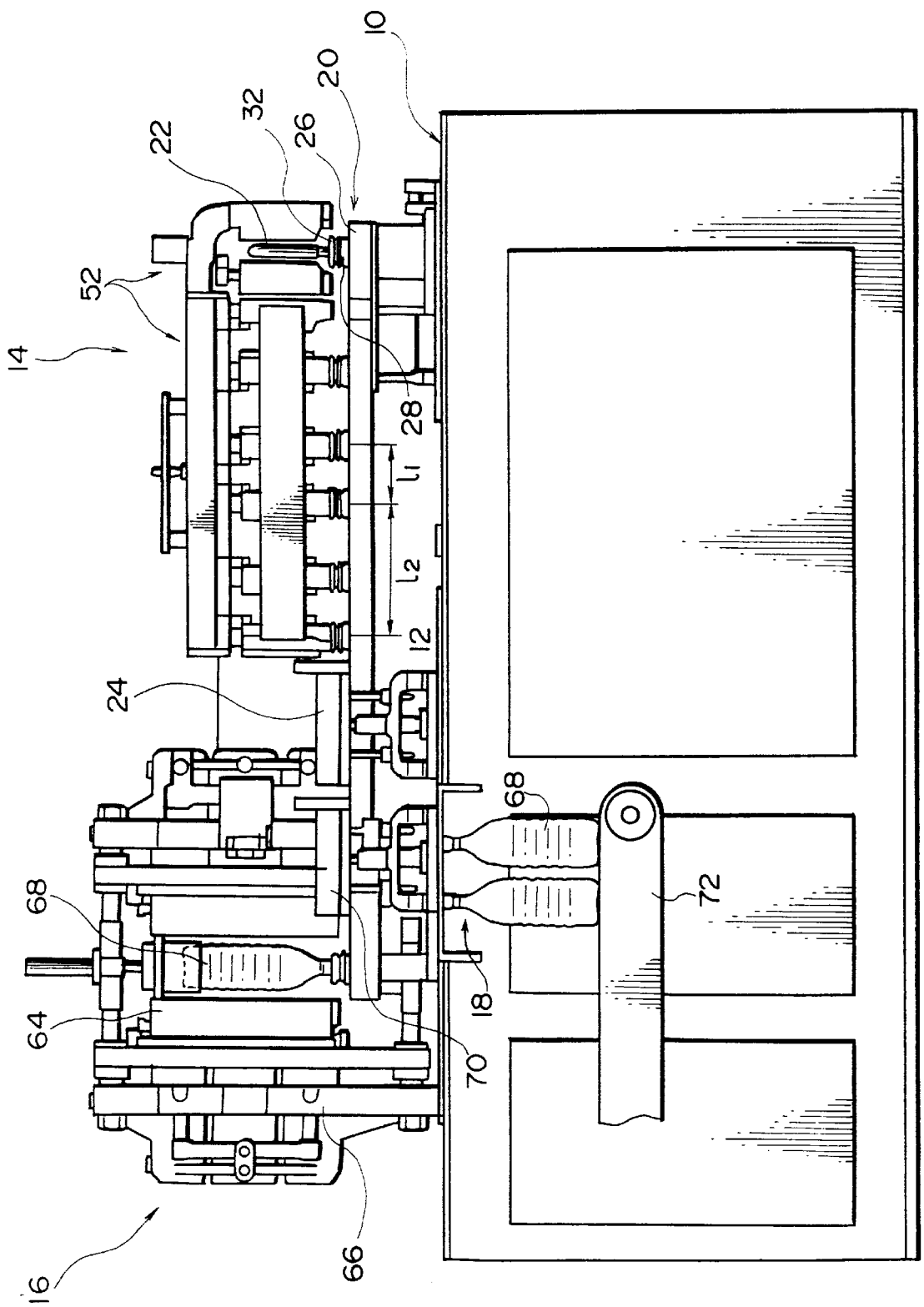
FIG. 2 is a front view of the blow molding apparatus shown in FIG. 1.

The product removing section 18 takes out products 68 blow molded by the blow molding section 16, and is located adjacent to the preform supply section 12, as shown in FIGS. 1 and 2. As seen best from FIG. 3, the product removing section 18 includes a pair of chuck mechanisms 70 as in the preform supply section 12. The chuck mechanisms 70 receive and grasp the necks 40 of the upside-down products 68 conveyed by the conveyor members 28, and are then turned over to feed the products 68 onto a take-out conveyor 72 with the necks 40 facing upwards.

A blow molding method which may be carried out by the blow molding apparatus relating to the present embodiment will be described below.

First of all, preforms 22 are injection molded by an injection molding machine (not shown). The injection molded preforms 22 are housed in a preform stacker. The preforms 22 are then supplied from the preform stacker into arranging means (not shown) via any suitable conveyor means such as a belt conveyor (not shown). After the preforms 22 are arranged by the arranging means, they are fed to the preform supply section 12 in an upright position.

In the preform supply section 12, the chuck mechanisms 24 grasp the necks of two preforms 22 separated by spacing $l_1$ corresponding to the spacing between adjacent preforms in the blow molding step. The chuck mechanisms 24 are then turned over so that the necks of the preforms 22 face downwards. The inverted preforms 22 are then delivered to the conveying section 20.

In the conveying section 20, two conveyor members 28 separated by the spacing $l_1$ are positioned opposite to the preform supply section 12. The conveyor pin 42 upwardly extending from the top of the placing bed 32 in each of the two conveyor members 28 is then inserted into the neck 40 of the corresponding preform 22. Thus, the preform 22 is supported on the corresponding conveyor member 28 in an inverted position.

Thereafter, the conveyor chain 36 means intermittently by one pitch $l_2$ through the conveyor sprocket 34. Thus, the conveyor members 28 engaged with the conveyor chain 36 also move by one pitch $l_2$ to convey the preforms 22 toward the preform heating sections 14.

In the preform heating sections 14, the first heating portion 52 heats the preforms 22 up to a blow molding temperature or a temperature slightly lower than the blow molding temperature. Since the first heating portion 52 includes separate heaters 56 located at positions where the preforms 22 stop intermittently with spacing corresponding to the conveying pitch $l_2$ in the conveying section 20 and on the opposite sides of the conveying path. The heaters 56 extend along the length of the preforms 22; therefore the heaters 56 may heat the entire preforms 22 reliably in a short time, and in a manner suitable for the blow molding cycle by intermittently conveying preforms to be blow molded at a time. Since the first heating portion 52 is relatively long, the preforms 22 can sufficiently be heated reliably and sufficiently. When the heaters 56 in the first heating portion 52 are suitably inclined, the preforms 22 may have a desired temperature gradient in the axial direction thereof, and the heat distribution in the heaters 56 may be corrected.

Thus, by intermittently conveying the preforms 22, they can be heated reliably by the separate heaters 56 before the preforms 22 are conveyed toward the second heating portion 54 through the conveying section 20.

In the second heating portion 54, the four heaters 62a, 62b, 62c and 62d extending in the direction of preform conveyance are aligned vertically. When the temperature in these heaters 62a, 62b, 62c and 62d is suitably adjusted, the temperature distribution can be applied reliably to the preforms 22 in the longitudinal direction.

When the preforms 22 are moved through the preform heating sections 14 by the conveying section 20, the preforms 22 are rotated about their axis through the placing beds 32 rotatably driven by the rotation sprocket 44 that is in turn driven by the chain 48 around the sprockets 46. Therefore, the preforms 22 can be heated reliably also around the circumferential direction thereof.

The preforms 22 are heated by the first heating portion 52 of the preform heating sections 14 and subjected to the vertical temperature distribution by the second heating portion 54. Then, the preforms 22 are conveyed to the blow molding section 16 by the conveying section 20.

In the blow molding section 16, the blow mold clamping devices 66 open the blow molds 64. The inverted preforms 22 are received by the opened blow molds 64. Then, the blow mold clamping devices 66 close and clamp the blow molds 64. A blow air is subsequently conducted into the preforms 22 so as to blow mold them into products 68. As described, the blow molding section 16 blow molds two preforms 22 at a time.

After the blow molding step, the blow mold clamping devices 66 open the blow molds 64 again. The conveying section 20 is then intermittently driven to move the products 68 to the product removing section 18.

In the product removing section 18, the chuck mechanisms 70 grasp the necks 40 of the inverted products 68. The product removing section 18 is then turned over and open the chuck mechanisms 70 to deliver the up-right products 68 to the take-out conveyor 72.

The present invention is not limited to the aforementioned embodiments thereof, but may be embodied in any one of various changed and modified forms without departing from the scope of the invention.

For example, the number of preforms to be blow molded at a time may be selected. In the aforementioned embodiments two or three preforms are blow molded at a time. Instead, one or more than four preforms may be blow molded at a time. In such a case, the spacing between adjacent preforms during the conveyance may be set relative to the spacing between adjacent preforms in the blow molding step.

Furthermore, the chain-and-sprocket power transmitting mechanisms are used in the aforementioned embodiments of the present invention may be replaced with any other power transmitting mechanism such as a combination of V-belt and toothed belt with pulleys.

I claim:

1. An apparatus for heating and subsequently blow molding synthetic resin preforms, comprising:
    a preform supply section for receiving and transferring preforms;
    preform heating sections for heating the preforms received from said preform supply section up to a blow molding temperature;
    a blow molding section for blow molding the preforms heated in said preform heating sections into final products;
    a product removing section for removing the blow molded products; and
    a conveying section for sequentially conveying the preforms and the products to said preform heating, blow molding and product removing sections; and wherein,
    said conveying section includes a substantially rectangular conveying path having two shorter and two longer sides;
    said blow molding section is disposed on one of said shorter sides of said conveying path;
    said preform heating sections are disposed on the other three sides of said conveying path; and
    said conveying section further includes rotating means for rotating said preforms conveyed along said three sides of said conveying path on which said preform heating sections are disposed.

2. The blow molding apparatus according to claim 1, wherein said conveying section includes conveyor members for holding the preforms and the products, and a conveyor chain on which said conveyor members are fixedly mounted, and wherein said conveyor members move with movement of said conveyor chain.

3. The blow molding apparatus according to claim 1, wherein said rotating means has an endless rotating chain for rotating the preforms which extends along the three sides of said conveying path on which said preform heating sections are disposed.

4. The blow molding apparatus according to claim 3, wherein said conveying section comprises conveying members for holding the preforms and the products, a conveyor chain on which said conveyor members are fixedly mounted, four first sprockets which are disposed in corners of said conveying path and engage with said conveyor chain, and three second sprockets which are disposed in the corners of the three sides of said conveying path on which said preform heating sections are disposed and engage with said endless rotating chain, and wherein said first and second sprockets disposed in the same corners share a shaft.

5. The blow molding apparatus according to claim 1, wherein said preform heating section disposed on a longer upstream side of said conveying path followed by the shorter side on which said blow molding section is placed includes heaters extending in a direction of preform conveyance and aligned vertically.

6. The blow molding apparatus according to claim 1, wherein said conveying section conveys the preforms intermittently, and wherein said preform heating section disposed on a longer upstream side of said conveying path includes a heater extending in a longitudinal direction of the preform on each side of said conveying path and is disposed at a position where each preform stops intermittently.

7. The blow molding apparatus according to claim 1, wherein said product removing section is juxtaposed with the preform supply section at an end of a longer downstream side of said conveying path followed by the shorter side on which said blow molding section is disposed in a direction of preform conveyance.

8. The blow molding apparatus according to claim 2, wherein said conveyor chain includes link members and hollow pins connecting the link members, and wherein each of said conveyor members includes a fixing pin detachably inserted into a corresponding hollow pin and is connected to said conveyor chain by said fixing pin.

9. An apparatus for heating and subsequently blow molding synthetic resin preforms each of which has an open neck portion, comprising:

a preform supply section for receiving and transferring preforms;

preform heating sections for heating the preforms received from said preform supply section up to a blow molding temperature;

a blow molding section for blow molding the preforms heated in said preform heating sections into final products;

product removing section for removing the blow molded products; and a conveying section for sequentially conveying the preforms and the products to said preform heating, blow molding and product removing sections along a conveying path; and wherein, said conveying section includes conveyor members for holding the preforms and the products, and a conveyor chain on which said conveyor members are fixedly mounted, each of said conveyor members has a base engaging with said conveyor chain and a conveyor pin detachably mounted on the base, said conveyor pin is inserted into said open neck portion of a corresponding preform for holding the preform, whereby said preforms and products are conveyed along said conveying path in an inverted state with said open neck portions facing downward.

10. The blow molding apparatus according to claim 9, wherein said conveyor chain includes link members and hollow pins connecting said link members, and wherein each of said conveyor members has a fixing pin detachably inserted into a corresponding hollow pin, the base of each of said conveyor members is connected to said conveyor chain by said fixing pin.

11. An apparatus for heating and subsequently blow molding synthetic resin preforms, comprising:

a preform supply section for receiving and transferring preforms;

preform heating sections for heating the preforms received from the preform supply section up to a blow molding temperature;

a blow molding section for blow molding the preforms heated in said preform heating sections into final products;

a product removing section for removing the blow molded products; and a conveying section for sequentially conveying the preforms and the products to said preform heating, blow molding and product removing sections along a conveying path; and wherein, said conveying section conveys the preforms intermittently;

said preform heating sections include first and second heating portions, said first heating section is located upstream from said second heating portion on said conveying path;

said first heating portion includes a heater extending in longitudinal direction of the preforms; and said second heating portion includes heaters which extend in a direction of preform conveyance and are aligned vertically.

12. The blow molding apparatus according to claim 11, wherein said conveying section conveys preforms to be blow molded at a time while maintaining spacing between adjacent preforms which is suitable for a blow molding step.

13. The blow molding apparatus according to claim 11, wherein said heater of said first heating portion is located on each side of said conveying path and is disposed at a position where each preform stops intermittently.

14. The blow molding apparatus according to claim 13, wherein said conveying section conveys preforms to be blow molded at a time while maintaining spacing between adjacent preforms which is suitable for a blow molding step.

* * * * *